(12) United States Patent
Wiemer et al.

(10) Patent No.: US 10,465,979 B2
(45) Date of Patent: Nov. 5, 2019

(54) SLURRIES OF GRANULATE MATERIAL FOR USE IN COOLING DEVICES

(71) Applicant: Cornelius Deutschland, Langenfeld (DE)

(72) Inventors: Klaus Wiemer, Muehlheim (DE); Detlef Dominik, Monheim (DE)

(73) Assignee: Cornelius Deutchland, Langenfeld (DE)

( * ) Notice: Subject to any disclaimer, the term of this patent is extended or adjusted under 35 U.S.C. 154(b) by 375 days.

(21) Appl. No.: 14/836,483

(22) Filed: Aug. 26, 2015

(65) Prior Publication Data

US 2016/0061515 A1    Mar. 3, 2016

Related U.S. Application Data

(60) Provisional application No. 62/041,758, filed on Aug. 26, 2014.

(51) Int. Cl.

| F25D 31/00 | (2006.01) |
|---|---|
| F28F 13/00 | (2006.01) |
| F28D 1/06 | (2006.01) |
| F28D 7/00 | (2006.01) |
| B23P 15/26 | (2006.01) |
| B67D 1/00 | (2006.01) |

(52) U.S. Cl.
CPC ............ F25D 31/003 (2013.01); B23P 15/26 (2013.01); B67D 1/0063 (2013.01); B67D 1/0064 (2013.01); F25D 31/002 (2013.01); F28D 1/06 (2013.01); F28D 7/0016 (2013.01); F28F 13/00 (2013.01); B67D 1/0014 (2013.01); F28F 2013/006 (2013.01)

(58) Field of Classification Search
CPC .. B67D 1/0014; B67D 1/0063; B67D 1/0057; B67D 1/0064; F25D 31/003; F25D 31/002; B23P 15/26; F28D 1/06; F28D 7/0016; F28F 13/00; F28F 2013/006
See application file for complete search history.

(56) References Cited

U.S. PATENT DOCUMENTS

| 2,979,463 A | * | 4/1961 | Ferguson | ............... C09K 5/066 |
|---|---|---|---|---|
| | | | | 252/70 |
| 3,892,335 A | * | 7/1975 | Schroeder | ............ B67D 1/0864 |
| | | | | 222/129.1 |
| 4,916,910 A | * | 4/1990 | Schroeder | ............ B67D 1/0864 |
| | | | | 62/390 |

(Continued)

FOREIGN PATENT DOCUMENTS

| DE | 202005007014 | 8/2006 |
|---|---|---|
| GB | 446345 | 4/1936 |

(Continued)

OTHER PUBLICATIONS

Xu (Thermal Conductivity of Nanoparticle-Fluid Mixture).*

(Continued)

*Primary Examiner* — Keith M Raymond
*Assistant Examiner* — Gordon A Jones
(74) *Attorney, Agent, or Firm* — Andrus Intellectual Property Law, LLP

(57) ABSTRACT

Disclosed are cooling devices for beverage dispensing systems. The devices include and utilize a slurry of granules and a liquid in order to facilitate heat transfer in the cooling device.

5 Claims, 4 Drawing Sheets

(56) References Cited

U.S. PATENT DOCUMENTS

| | | | | |
|---|---|---|---|---|
| 5,544,495 A | * | 8/1996 | Anderson | F25D 23/061 |
| | | | | 62/298 |
| 2007/0059201 A1 | * | 3/2007 | Sundaram | A23L 3/3454 |
| | | | | 422/28 |
| 2008/0010999 A1 | * | 1/2008 | Sonnenrein | C09K 5/066 |
| | | | | 62/3.64 |

FOREIGN PATENT DOCUMENTS

| WO | 2008009047 | 1/2008 | | |
|---|---|---|---|---|
| WO | WO 2008114047 A1 | * | 9/2008 | B67D 1/0864 |
| WO | 2013025110 | 2/2013 | | |
| WO | WO 2013025110 A2 | * | 2/2013 | F25D 31/002 |

OTHER PUBLICATIONS

Ahmet San ; Form-stable paraffin/high density polyethylene composites as solid-liquid phase change material for thermal energy storage: preparation and thermal properties; Department of Chemistry, Gaziosmanpasa University, 60240 Tokat, Turkey Received Aug. 1, 2003; accepted Oct. 26, 2003 (Year: 2004).*

International Search Report and Written Opinion for PCT/IB2015/001442 dated Nov. 27, 2015.

International Preliminary Report on Patentability for PCT/IB2015/001442 dated Feb. 28, 2017.

* cited by examiner

SLURRIES OF GRANULATE MATERIAL FOR USE IN COOLING DEVICES

CROSS-REFERENCE TO RELATED PATENT APPLICATIONS

The present application claims the benefit of priority under 35 U.S.C. § 119(e) U.S. Provisional Application No. 62/041,758, filed on Aug. 26, 2014, the content of which is incorporated herein by reference in its entirety.

FIELD

The present disclosure relates to heat exchangers, which can be used in beverage coolers. In particular, the disclosure relates to slurries comprising granulate material such as granulate metal materials that may be used as a heat exchange medium in a beverage cooling system.

BACKGROUND

Existing aluminum block heat exchangers typically are cast from hot liquid aluminum. The process is expensive and requires casting tooling.

Known casted aluminum blocks typically use an evaporator to supply cooling energy from a refrigeration circuit that cools down the aluminum block. An evaporator coil circulates refrigeration fluid through the block. Together with the evaporator coil, one or more product cooling coils are cast into the block. The product itself is cooled as it passes through the cooling coils that are cast within the aluminum block.

However, after the evaporator coils and/or product cooling coils are cast into the block, the coils cannot be removed and replaced as necessary. Therefore, an improved heat exchanger that permits removal and replacement of evaporator coils and/or product cooling coils is desirable.

Furthermore, air gaps may be created during the casting process. These air gaps result in uneven distribution of heat inside the aluminum block and inefficient cooling of evaporator coils and/or product cooling coils that are cast in the aluminum block. Therefore, an improved heat exchanger in which gaps are minimized or prevented is desirable.

SUMMARY

Disclosed are cooling devices for beverage dispensing systems. The devices include and utilize a slurry of granulate material and a liquid in order to facilitate heat transfer in the cooling device.

The devices typically include several components. Typical components may include: (a) an insulation body, preferably an insulation body comprising an interior that is sealed against the environment; (b) a slurry of granulate material (e.g., metal granulate material such as aluminum granules or aluminum alloy granules) and a liquid, the slurry contained within the interior of the insulation body; and (c) one or more circulation lines passing through the interior of the insulation body, the one or more circulation lines in contact with the slurry.

Suitable configurations for the circulation lines may include circulation coils. In the cooling devices, preferably the slurry fills any gaps between the coil and the insulation body (i.e., where no air gaps or bubs are present in the slurry).

Preferably, the cooling devices also comprise an evaporator. The evaporator may pump or circulate cooling fluid through a circulation line in the insulation body, for example, where the circulation line is an evaporator coil. Optionally, the circulation line or evaporator coil may comprise polymeric material.

Preferably, the cooling devices also comprise a pump for circulating a beverage component through a circulation line in the insulation body, for example, where the circulation line is a cooling coil. Optionally, the circulation line or cooling coil may comprise polymeric material. Beverage components circulated through the circulation line or cooling coil may include a diluent such as water or carbonated water The slurry of the cooling devices comprises granules and a liquid. Preferably, the granules have an effective average diameter of about 0.4 mm to about 1.2 mm. The slurry preferably comprises a larger volume of granules versus liquid. In some embodiments, the slurry comprises about 60% to about 80% granules (v/v) and about 20% to about 40% liquid (v/v). Suitable liquids for the slurry may include water. Optionally, agents may be added to the water in order to inhibit microbial growth in the slurry (e.g., anti-microbial agents) and/or corrosion of the granules, insulation body, and/or circulation lines (e.g., corrosion inhibitors).

The disclosed devices may be prepared by methods that include the following step: (a) providing an insulation body, and preferably a sealable insulation body; (b) placing a slurry comprising granules (e.g., metal granules such as aluminum granules or aluminum alloy granules) with an average effective diameter of about 0.4 mm to about 1.2 mm and a liquid in the interior insulation body, for example where the slurry may be prepared outside the interior of the insulation body and subsequently placed in the insulation body, the slurry may be prepared in the interior of the insulation body; (c) placing one or more circulation lines in the slurry; and (d) sealing the interior of the insulation body against the outside environment.

The disclosed device may he utilized in order to cool a beverage component in a beverage dispensing system. For example, the methods may include pumping the beverage component through a cooling device, the cooling device comprising: (a) an insulation body, wherein the interior of the insulation body is sealed against the environment; (b) a slurry of granules (e.g., metal granules such as aluminum granules or aluminum alloy granules) and a liquid, the slurry contained within the interior of the insulation body; (c) one or more circulation lines passing through the interior of the insulation body and in contact with the slurry, wherein the beverage component is cooled by pumping the beverage component through a circulation line in the interior of the insulation body.

DETAILED DESCRIPTION

Figure 1:
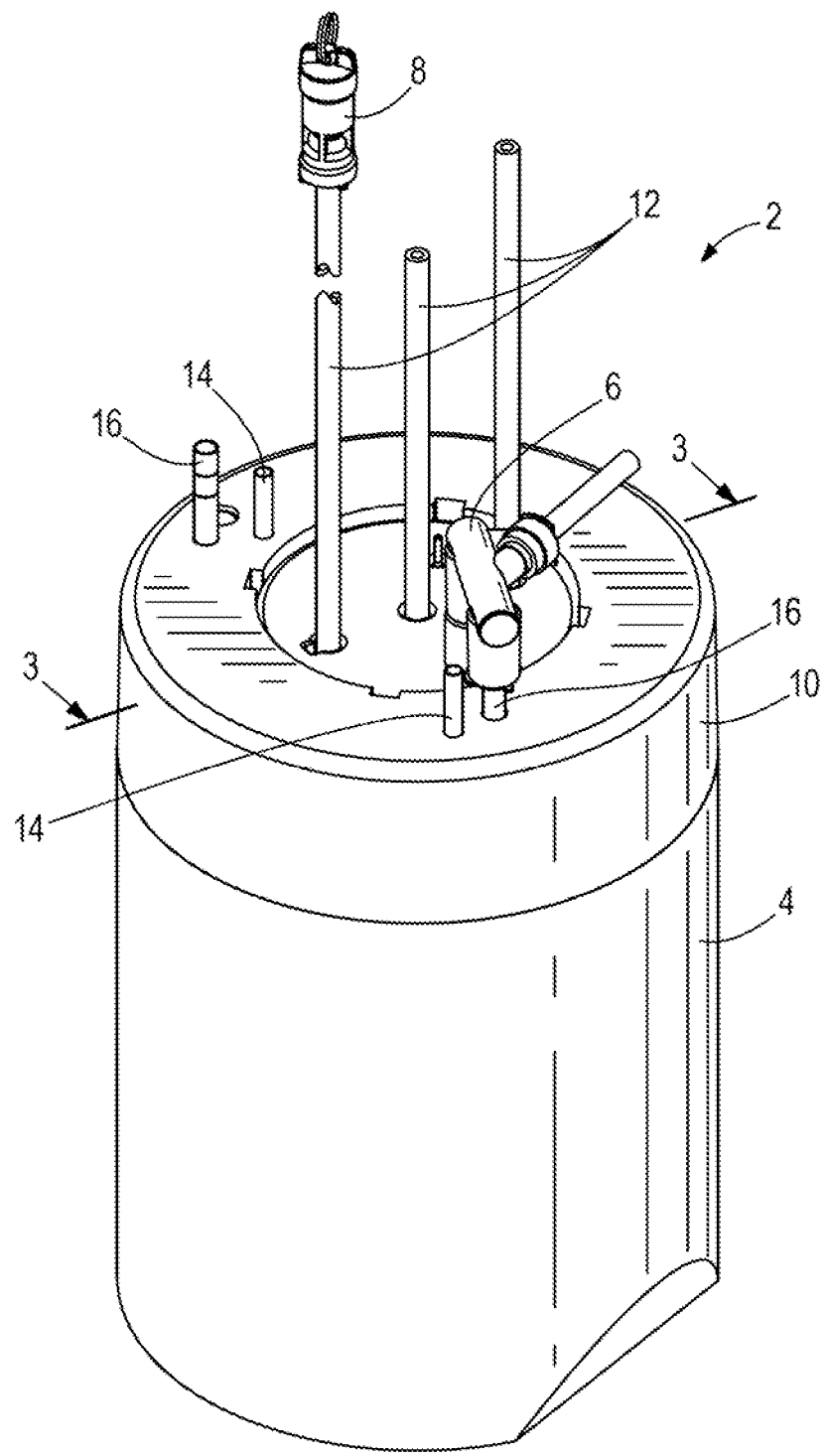
FIG. 1 illustrates a perspective view of one embodiment of an assembled cooling device as contemplated herein.

The present invention is described herein using several definitions, as set forth below and throughout the application.

As used in this Specification and the claims, the singular forms "a," "an," and "the" include plural forms unless the context clearly dictates otherwise. For example, the term "a circulation line" should be interpreted to mean "one or more circulation lines" unless the context clearly dictates otherwise. As used herein, the term "plurality" means "two or more."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean up to plus or minus 10% of the particular term and "substantially" and "significantly" will mean more than plus or minus 10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

Disclosed herein are cooling, devices for beverage dispensing systems. The cooling devices include and utilize a slurry of granulate material and liquid in order to facilitate heat transfer in the device.

Suitable granulate material may include granulate material having a suitable thermal conductivity (k=W/(m•K)). For example, in some embodiments, the granulate material has a thermal conductivity (k) of at least about 30, 40, 50, 100, 150, 200, 250, 300, 350, or 400 W/(m•K). Suitable granulate material also may include granulate material having a suitable specific heat capacity ($C_p$=kJ(kg•K)). For example, in some embodiments, the granulate material has a specific heat capacity ($C_p$) of at least about 0.1, 0.2, 0.3, 0.4, 0.5, 0.6, 0.7, 0.8, 0.9, or 1.0 kJ/(kg•K).

Suitable granulate material may include, but is not limited to granulate metal material. Suitable metal material may include pure metal material or metal alloys. Suitable metals and metal alloys for the granulate metal may comprise, but are not limited to one or more of aluminum, steel, iron, copper, lead, nickel, silver, and tin. A preferred metal or metal alloy for the granulate material may include aluminum or an aluminum alloy (e.g., an alloy comprising at least about 50%, 60%, 70%, 80%, 90%, 95%, 96%, 97%, 98%, or 99% aluminum).

Cooling devices of the prior art utilize cooling lines (e.g., coils) that are cast in solid aluminum. In some embodiments of the present devices, the cast aluminum is replaced with a slurry of granulate material (e.g., aluminum or an aluminum alloy) and a liquid (e.g., an aqueous solution such as water). The granulate material typically has an average effective diameter of about 0.4 mm to 1.2 mm. The main component of the slurry may be the granulate material. For example, the slurry may comprise about 60-80% aluminum granulate and about 20-40% liquid. Cooling devices that utilize the aluminum/liquid slurry may include a coil set that is placed into an open insulation body (e.g., comprising a polystyrene of similar insulating material) where the aluminum slurry fills the gaps between the insulation body and the coils. The liquid of the slurry may replaces any air pockets in the slurry and provide a contact medium between the coils and the granulate material.

Use of a slurry rather than a cast aluminum block in the presently disclosed cooling devices reduces cost and lead time and provides for flexibility in manufacturing the cooling devices. For example, in embodiments where the presently disclosed devices utilize a slurry of aluminum granulate material and a liquid instead of a cast aluminum block, aluminum mass is reduced and the cost of the disclosed devices is reduced. The cost of the devices is reduced because granulate is cheaper than casted material. Also, use of a slurry rather than a cast aluminum block provides for flexibility because the slurry can be added to the devices at the production line where the beverage dispensing system is manufactured. No casting tooling is required because the slurry can be filled in any insulation box. Finally, due to the heat generated during the current casting process, stainless coils (ASISI 304) typically must be used. In the presently disclosed devices, the circulation lines may be manufactured from other materials, including polymeric materials.

In some embodiments of the disclosed devices, aluminum may be provided as a granulate with an average effective diameter of about 0.4 mm to about 1.2 mm. An aluminum slurry for the disclosed devices may be prepared by combining about 60-80% aluminum granulate and about 20-40% liquid (e.g., 65-75% aluminum granulate and about 25-35% liquid, or about 70% aluminum granulate and about 30% liquid). Suitable liquids for the slurry include aqueous liquids or water, which optionally may be supplemented with additional agents to prevent microbial growth in the slurry and/or corrosion of the granules, the circulation lines, or insulation body of the devices. The aluminum slurry may be mixed in a mixing device where the ratio between liquid and aluminum is selected (e.g., 60-80% granulate and 20-40% liquid). The coil set may be placed in a foil bag and then the foil bag containing the coil set may be placed in an open insulation body. The aluminum slurry then may be placed in the aluminum bag where the aluminum slurry fills the gaps between the coils and replaces any air pockets in the slurry and provides contact between the coils and the aluminum bag. The filled assembly may placed on a vibrating table and vibrated to make sure that all air can escape out of the aluminum slurry prior to sealing the open insulation body. The top surface of the insulation body typically is sealed in order to prevent evaporation of liquid from the slurry. Suitable sealing material may include industrial wax which is melted and dispensed onto the wet sealing surface of the insulation body and then the top of the insulation body may be placed on the insulation body in contact with the melted wax.

Turning now to the drawings, FIG. 1 illustrates a perspective view of one embodiment of an assembled cooling device 2 as contemplated herein. The cooling device 2 includes an insulation body 4 having a sealable top 10. Illustrated exiting through the sealable top 10 are a line from a cooling coil 16 and a line from an evaporator coil 14. Also shown are inlet and outlet tubes for water, gas, and carbonated water 12, one of which includes a relief valve 8. A manifold for the device 6 also is shown.

Figure 2:
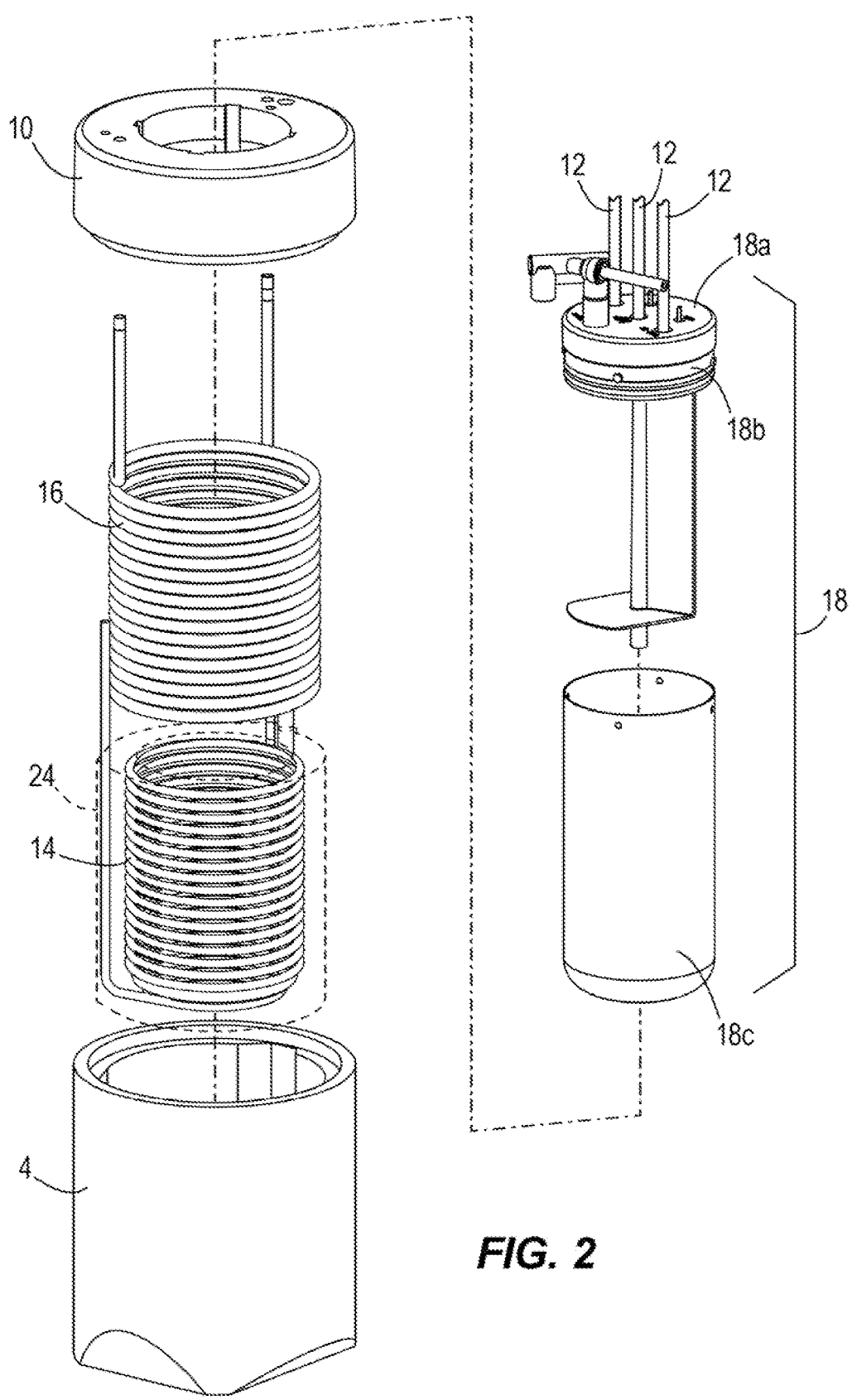
FIG. 2 illustrates a perspective view of one embodiment of a disassembled cooling device as contemplated herein.

FIG. 2 illustrates a perspective view of one embodiment of a disassembled cooling device. The sealable top 10 has been removed and the evaporator coil 14 and cooling coil 16 have been disassembled. The dashed line illustrates an optional bag 24 which may be aluminum and in which the evaporator coil 14 and cooling coil 16 may be placed prior to placing the bag 24 into the insulating body 4. The slurry (20 shown in FIGS. 3 and 4) then may be placed into the insulating body 4, or optionally bag 24 in order to provide a heat transfer medium for the evaporator coil 14 and cooling coil 16. The slurry contacts the evaporator coil 14 and cooling coil 16 and displaces any air between the coils. Also shown is the carbonator assembly 18 including the carbonator insulated top 18a, carbonator core 18b, and carbonator tank 18c. The carbonator assembly 18 is placed inside the insulation body 4 prior to sealing the insulation body 4 with the sealable top 10.

In use, in this embodiment of the cooling device 2, water enters the cooling coil 16 and is cooled by the evaporator coil 14 in the insulation body 4. After the water is cooled, the water exits the cooling coil 16 enters the carbonator tank 18c where the water is carbonated and the carbonated water then may exit the cooling device 2 through an outlet tube 12 In this embodiment of the cooling device, the carbonator tank 18c is in direct contact with the slurry 20 in the insulation body 4. In cooling devices of the prior art in which the cooling coils are cast in aluminum, a draft angle during casting causes a gap between the cast aluminum and the carbonator tank.

Figure 3:
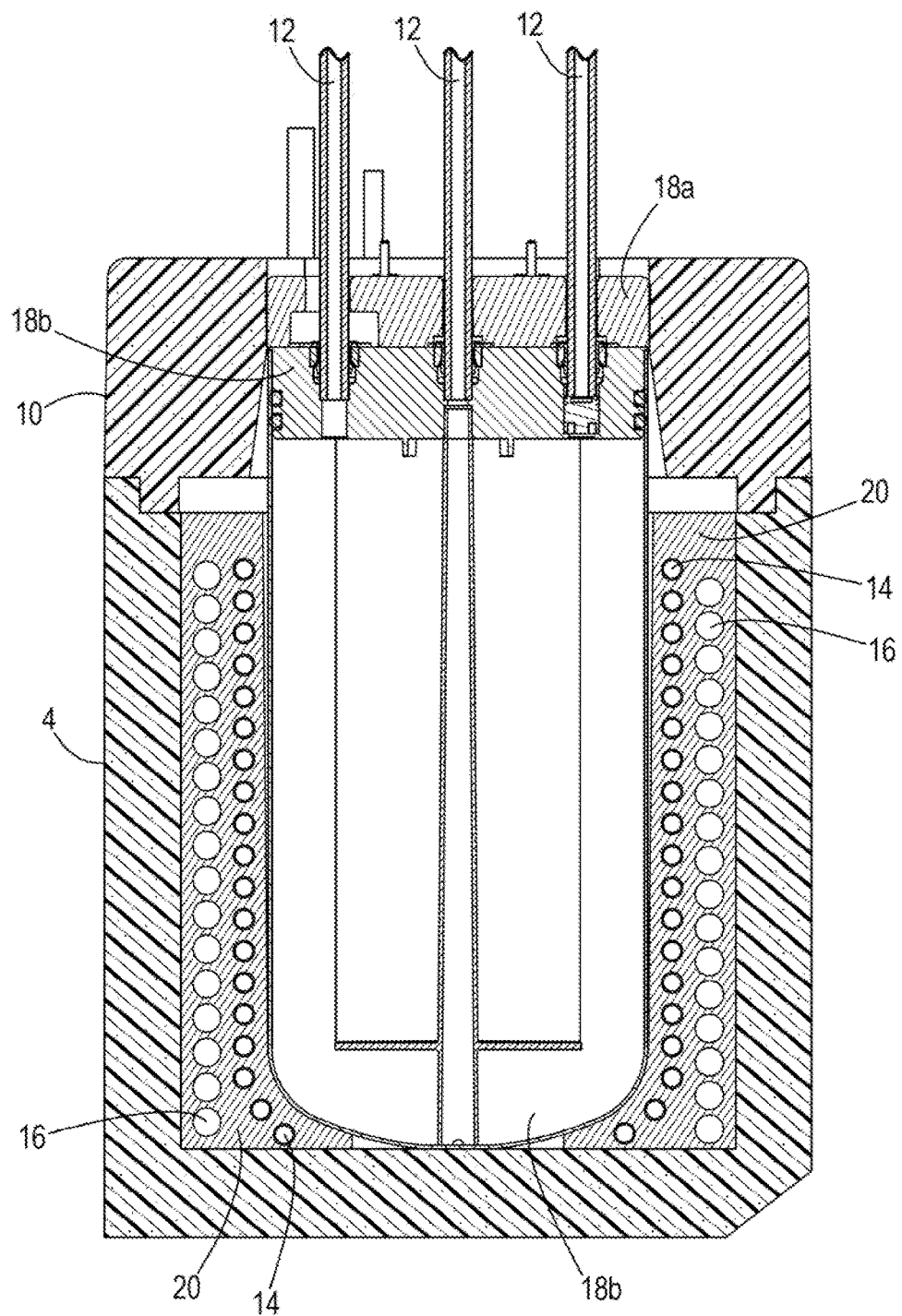
FIG. 3 illustrates a cross-sectional view along 3-3 of the assembled cooling device of FIG. 1.

FIG. 3 illustrates a cross-sectional view along 3-3 of the assembled cooling device of FIG. 1. Illustrated are a cross-sectional view of the insulation body 4, sealable top 10, carbonator top 18a, carbonator core 18b, carbonator tank 18c, evaporator coil 14, cooling coil 16, and slurry 20, which surrounds the evaporator coil 14 and cooling coil 16.

Figure 4:
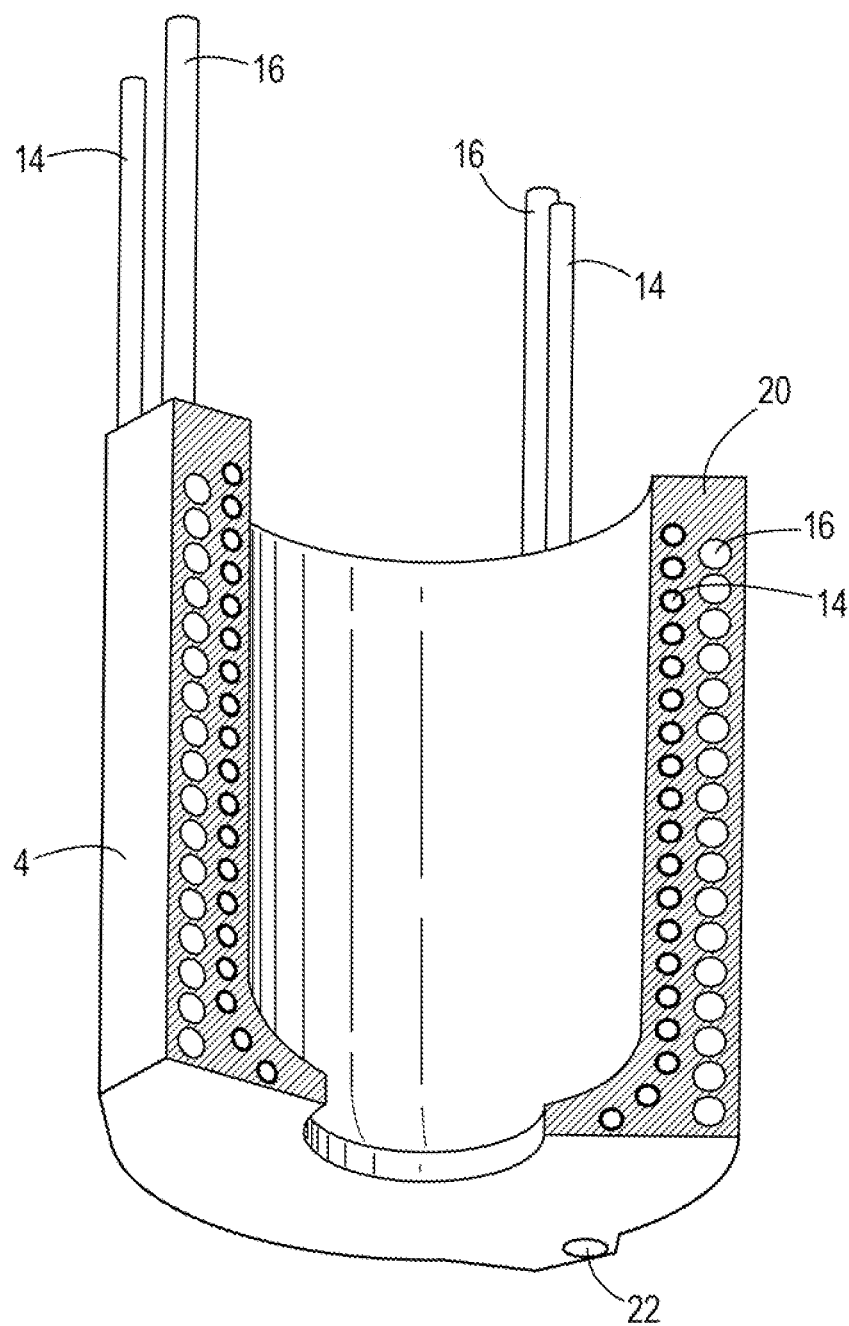
FIG. 4 illustrates a cross-sectional, perspective view of a component of a cooling device as contemplated herein.

FIG. 4 illustrates a cross-sectional, perspective view of a component of a cooling device as contemplated herein. Illustrated are a cross-sectional view of the insulation body 4, evaporator coil 14, cooling coil 16, and slurry 20, which surrounds the evaporator coil 14 and cooling coil 16.

In the present disclosure, certain terms have been used for brevity, clearness and understanding. No unnecessary limitations are to be implied therefrom beyond the requirement of the prior art because such terms are used for descriptive purposes only and are intended to be broadly construed. The different devices and methods described herein may be used alone or in combination with other devices and methods. Various equivalents, alternatives and modifications are possible within the scope of the appended claims.

What is claimed is:

1. A cooling device for a beverage dispensing system:
    (a) an insulation body, wherein the insulation body is sealed;
    (b) a slurry of granulate material and a liquid comprising water, the slurry contained within the insulation body, wherein the granulate material comprises granulate metal material, wherein the granulate metal material comprises granulate aluminum material or granulate aluminum alloy material and the granulate metal material has an effective average diameter of 0.4 mm to 1.2 mm and wherein the slurry comprises 60% to 80% granules (v/v) and 20% to 40% liquid (v/v); and
    (c) one or more circulation lines passing through the insulation body and in contact with the slurry.

2. The cooling device of claim 1, wherein the one or more circulation lines comprise a coil and the slurry fills any gaps between the coil and the insulation body.

3. The cooling device of claim 2, wherein the coil and the slurry are present in a bag that is placed in the insulation body.

4. The cooling device of claim 1, wherein the liquid of the slurry comprises water and an antimicrobial agent.

5. The cooling device of claim 1, wherein the liquid of the slurry comprises water and a corrosion inhibitor.

* * * * *